United States Patent [19]

Kusayama et al.

[11] 4,035,677

[45] July 12, 1977

[54] ROTOR OF A MICRO MOTOR

[75] Inventors: Takaji Kusayama, Kashiwa; Katsuji Aoki, Funabashi, both of Japan

[73] Assignee: Kabushiki Kaisha Daini Seikosha, Japan

[21] Appl. No.: 624,468

[22] Filed: Oct. 21, 1975

[30] Foreign Application Priority Data

Oct. 21, 1974 Japan .................... 49-121267

[51] Int. Cl.² ...................... H02K 15/00
[52] U.S. Cl. .................. 310/42; 310/156; 310/261
[58] Field of Search ............. 310/42, 261, 156; 58/23 D

[56] References Cited
U.S. PATENT DOCUMENTS 2,190,956  2/1940  Tognola .................... 310/156

*Primary Examiner*—Donovan F. Duggan
*Attorney, Agent, or Firm*—Robert E. Burns; Emmanuel J. Lobato; Bruce L. Adams

[57] ABSTRACT

In a rotor of a micro motor, a magnet is indirectly attached to a rotor shaft by means of a pair of bushes without using any adhesive material. The pair of bushes comprises upper and lower bushes which are respectively mounted by means of an interference fit around the rotor shaft. Each bush comprises a cylindrical portion in the center of which a hole is formed, and a flange portion having around its periphery an annular notched portion. The notched portion of the upper bush is formed on a lower surface of the flange portion adjacent to the outer periphery of the cylindrical portion while the annular notched portion of the lower bush is formed on an upper surface of the flange portion adjacent to the outer periphery of the cylindrical portion, and due to the notched portions, each flange portion is provided with a certain degree of resiliency. The magnet is loosely fitted over the outer periphery of the cylindrical portions of the respective bushes and disposed between the flange portions thereof so that it is clamped between the flange portions of the bushed by means of the resiliency of the flange portions and thereby fixed between both bushes.

7 Claims, 3 Drawing Figures

ROTOR OF A MICRO MOTOR

BACKGROUND OF THE INVENTION

This invention relates to a rotor of a micro motor, and more particularly to a rotor of a micro motor for an electronic timepiece.

In micro motor used in electronic timepieces, a permanent magnet is generally mounted on a rotor shaft which is surrounded by a stator. However, when the magnet is made of a material having a fragility such as a ferritic steel, it is necessary to avoid mounting the magnet directly on the rotor shaft because the magnet tends to crack or craze. Therefore, as shown in FIG. 1, a bush 2 provided with a flange is mounted around a rotor shaft 1, and a magnet 3 is loosely fitted around the outer periphery of the bush 2 and secured thereto by means of an adhesive.

However, the adhering operation is not carried out automatically but must be manually effected, so that mass productivity is low. Further, in particular, the rotor of a watch is so small that the adhesive for fixing the magnet to the bush frequently becomes stuck to a portion which is not desired to be adhered, thereby resulting in a decrease in accuracy of motor operation, an increase in the number of inferior goods and a decrease in the overall yield of productivity.

SUMMARY OF THE INVENTION

It is therefore an object of the present invention to eliminate the above-mentioned drawbacks and to provide an improved rotor of a micro motor which is easily assembled without using an adhesive material and which has a high accuracy.

DESCRIPTION OF PREFERRED EMBODIMENTS

The present invention will be fully described by way of the preferred embodiment in connection with the accompanying drawings.

Figure 1:
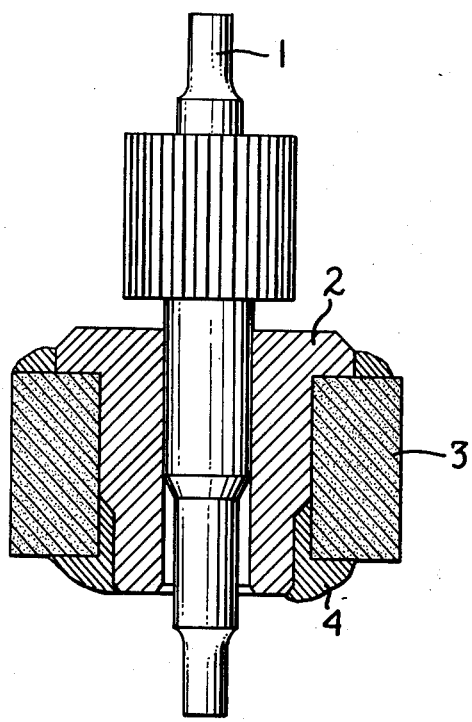
FIG. 1 is a sectional view showing a conventional prior art rotor structure.
Figure 2:
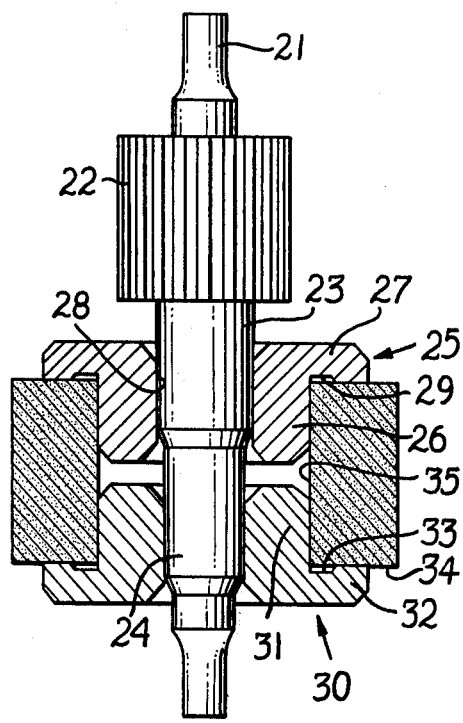
FIG. 2 is a sectional view showing a rotor structure according to the present invention.

In FIG. 2, a rotor shaft 21 is provided at its upper portion with a gear wheel 22 and at the lower portion thereof is provided with a step portion. The step portion divides the rotor shaft into two sections, that is a large diameter portion 23 and a small diameter portion 24. A bush 25 comprises a cylindrical portion 26, a flange portion 27 and a cylindrical hole 28 which is formed in the center of the cylindrical portion 26 and the diameter of which is slightly less than that of the large diameter portion 23 of the rotor shaft 21. The bush 25 is tightly mounted with an interference fit around the large diameter portion 23 of the rotor shaft 21 through the cylindrical hole 28 (the form of which corresponds and that of the corresponding portion of the rotor shaft. The bush 25 is provided with an annular notched portion 29 which is formed on the lower surface of the flange portion 27 adjacent to the cylindrical portion 26 of the same bush thereby imparting to the flange portion of the bush a certain degree of resiliency.

Around the lower portion, that is the small diameter portion 24, another bush 30 is mounted also with an interference fit. The bush 30 has the same outer diameter as that of the bush 25, and comprises, similarly to the bush 25, a cylindrical portion 31 in the center of which is formed a cylindrical hole the diameter of which is slightly less than that of the small diameter portion 24 of the rotor shaft 21 and the form of which corresponds to that of the corresponding portion of the rotor shaft. The bush 30 has a flange portion 32 and an annular notched portion 33 which is formed on the upper surface of the flange portion 32 adjacent to the outer periphery of the cylindrical portion.

A magnet 34 has a cylindrical form and a cylindrical hole 35 at its center. The magnet is a permanent magnet made of, for example, a ferritic steel. The magnet has an inner diameter surface to fit around the cylindrical outer portions of bushes 25 and 30 and a size selected so as to fit between the flange portions of the bushes.

In assembling the rotor according to the present invention, the bush 25 is mounted with an interference fit around the large diameter portion 23 of the rotor shaft by pressing from the lower end of the rotor shaft to said large diameter portion through the cylindrical hole 28 of the bush to be tightly fitted around said portion of the rotor shaft with the flange portion 27 being turned-up, and after that the magnet 34 is loosely fitted around the outer periphery of the cylindrical portion 26 of the bush 25. Then the other bush 30 is mounted with an interference fit by pressing from the lower end of the rotor shaft around the small diameter portion 24 of the rotor shaft reversely to the bush 25, that is the cylindrical portion 31 is turned-up during the mounting operation. In this case, the cylindrical inner periphery of the magnet is loosely fitted to the outer periphery of the cylindrical portion 31 of the bush 30, and then the magnet is clamped by the flange portions of both the bushes by means of the resiliency of the flange portions upon receiving the pressure from upper and lower sides of said flange portions, whereby the magnet is fixed between the bushes around the rotor shaft. In this way, the magnet is attached to the rotor shaft.

Figure 3:
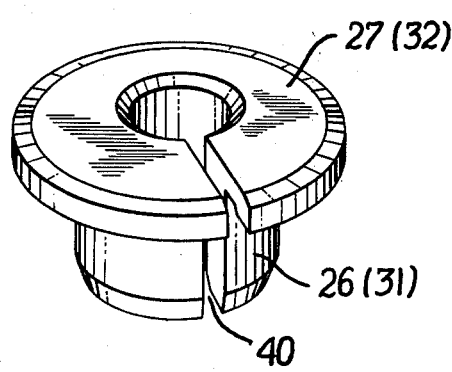
FIG. 3 is a perspective view of a bush used in the rotor of the present invention.

In FIG. 3, each bush is provided at its circumferential portion with a slot 40 so as to have an elasticity which makes easy the interference fit of the bush around the rotor shaft under such a pressing operation as mentioned above.

In addition, while the rotor shaft is provided with the step portion which permits a smooth fitting of the bush 25 around the rotor shaft, it is not necessary to provide the step portion, for example, in case the bushes 25 and 30 are mounted from the upper and lower ends of the rotor shaft.

As mentioned above, in the rotor structure according to the present invention, since the magnet is loosely fitted to the outer peripheries of the cylindrical portions of a pair of bushes which are respectively mounted around the rotor shaft with an interference fit and the magnet is clamped between the flange portions of respective bushes, no adhering operation is necessary to mount each part on the rotor shaft, whereby the rotor of the present invention is automatically assembled. Therefore, the productivity yield is remarkably improved. Further, the accuracy of the micro motor including the rotor according to the present invention is also improved since no adhesive material is used.

Moreover, the resiliency of the flange portions of respective bushes serves to prevent the magnet from directly receiving an externally applied impact.

What is claimed is:

1. A rotor structure of a micro motor for use with timepieces and the like comprising: a rotor shaft; an upper bush and lower bush connected to said rotor shaft and extending in axially spaced relationship therealong, each bush comprising a cylindrical portion having a hole in the center thereof through which extends said rotor shaft, a flange portion connected to said cylindrical portion at the end thereof remote from the other bush, and means rendering said flange portion resilient to a certain degree with respect to the axial direction of said rotor shaft; and a magnet having a hole therein disposed around the cylindrical portions of both said upper and lower bushes and being resiliently clamped at opposite ends between the flange portions of said upper and lower bushes thereby fixing said magnet relative to said rotor shaft by the resiliency of said flange portions and without use of adhesive.

2. A rotor structure of a micro motor according to claim 1, wherein said rotor shaft has a step portion by which it is divided into a large diameter portion around which said upper bush is mounted with an interference fit and a small diameter portion around which said lower bush is mounted with an interference fit, said small diameter portion permitting a smooth insertion of the rotor shaft into respective holes of said bushes during an interference fitting operation of the bushes around said rotor shaft.

3. A rotor structure of a micro motor according to claim 1, wherein the diameter of said hole of each bush is slightly less than that of each corresponding portion of the rotor shaft, whereby each bush is mounted with an interference fit around each corresponding portion of the rotor shaft.

4. A rotor structure of a micro motor according to claim 1, wherein the outer diameter of both bushes is the same, and the inner diameter of the magnet is similar to each outer diameter of the cylindrical portion of said bushes, whereby said magnet is fitted around the cylindrical portions of bushes.

5. A rotor structure of a micro motor according to claim 1, wherein said resiliency of the flange portion of each bush is sufficient to prevent said magnet from directly receiving an impact imposed thereon.

6. A rotor structure of a micro motor according to claim 1, wherein said each bush is provided at its circumferential portion with a slot to impart elasticity thereto.

7. A rotor structure of a micro motor according to claim 1; wherein said means rendering the flange portion of each bush resilient comprises means defining a generally annular notched portion on the lower surface of said upper bush flange portion adjacent to the cylindrical portion thereof and means defining a generally annular notched portion on the upper surface of said lower bush flange portion adjacent to the cylindrical portion thereof.

* * * * *